Jan. 18, 1966 G. E. STANGELAND 3,230,458
AUTOMATIC GAIN CONTROL CIRCUIT WITH FAST CHANGE OF TIME CONSTANT
Filed May 18, 1962
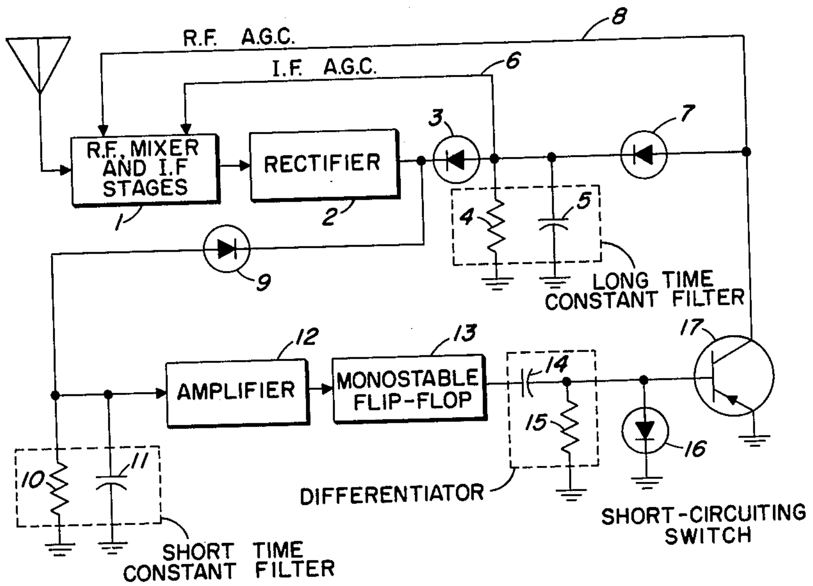
INVENTOR.
GUSTAV E. STANGELAND
BY Moody and Antrim
AGENTS United States Patent Office 3,230,458

Patented Jan. 18, 1966

3,230,458
AUTOMATIC GAIN CONTROL CIRCUIT WITH FAST CHANGE OF TIME CONSTANT

Gustav E. Strangeland, Richardson, Tex., assignor to Collins Radio Company, Cedar Rapids, Iowa, a corporation of Iowa Filed May 18, 1962, Ser. No. 196,855
3 Claims. (Cl. 325—410)

This invention pertains to automatic-gain-control circuits for radio receivers and particularly to automatic-gain-control circuits that increase the sensitivity of their respective receivers instantly when a decrease in incoming signal is faster than a predetermined rate. The automatic gain control of this invention is particularly applicable to radio receivers that are to receive information at high speed when successive signals have much different levels of intensity. For example, when a receiver is to receive messages from several different transmitters that are widely dispersed, the receiver may be equipped with means for detecting the presence of and identifying signals that are transmitted in rapid sequence from the different transmitters. This operation may be called a roll call of outlying stations. During the roll call, weak signal from a distant station may be passed over without detection because the sensitivity of the receiver is still dependent upon gain control voltage retained from an immediately preceding signal of much higher level from a close station.

The usual automatic-gain-control circuit requires a filter or integrating capacitor to prevent undesired variations of automatic-gain-control voltage with modulation. A delay in the restoration of sensitivity of the receiver when the level of the incoming signal is suddenly decreased, is caused by a charge retained on the capacitor. The circuit of the present invention includes a differentiator for detecting a sudden decrease of signal level and short-circuiting means responsive to the decrease exceeding a predetermined rate for momentarily short-circuiting the filter capacitor. The controlled receiver is instantly restored to full sensitivity and the capacitor becomes charged quickly as required to control the signal for obtaining the desired output level.

An object of the present invention is to provide means for momentarily neutralizing the control voltages on automatic-gain-control filters of radio receivers when the received signals change quickly from high to low levels.

The following description and the appended claims may be more readily understood with reference to the accompanying drawing in which the single figure shows the circuit of the present invention in a combination block and schematic diagram.

With reference to the figure, usual radio-frequency amplifier stages 1 of a radio receiver apply signal to a rectifier 2. The rectifier may comprise four diodes connected in a conventional manner for obtaining full-wave rectified output. The output of the rectifier is connected through an isolating diode 3 that is not required in usual circuits to a conventional long-time constant filter having parallel resistor 4 and capacitor 5. Certain radio-frequency amplifier stages may have a gain control conductor 6 connected directly to the long-time constant filter for controlling gain. Other radio-frequency circuits having gain control conductor 8 may be connected through diode 7 to capacitor 5 of the long-time constant filter. This circuit is provided with a short-circuiting switch that normally discharges capacitor 5 when the signal varies abruptly from any level to a much lower level.

The circuit for controlling the short-circuiting switch includes a short-time constant filter that functions as a differentiator, amplifier 12, and monostable multivibrator or flip-flop 13. The input of the control circuit is connected from the output of rectifier 2 through diode 9 to the short-time constant filter that comprises resistor 10 and capacitor 11 connected in parallel. Diode 9 is connected in the required sense for conducting current when the output of the rectifier is more negative than the voltage existing on the short-time constant filter. Diode 3 which is connected between the output of the rectifier and the long-time constant filter is also connected in the proper sense for applying a negative voltage to capacitor 5 of the long-time constant filter. This connection of diode 3 permits the output of the rectifier to change rapidly to lower negative voltage independent of higher voltage that may be retained on capacitor 5. Therefore the voltage applied from the rectifier across capacitor 11 of the short-time constant filter may be decreased much more rapidly than the voltage across capacitor 5 of the long-time constant filter.

The input of amplifier 12 is connected across capacitor 11 for amplifying a sudden decrease in voltage for application to monostable flip-flop 13. The relatively low capacitance of capacitor 11 causes the short-time constant filter to operate as a differentiator with respect to the rectified signal. The voltage applied from the capacitor through amplifier 12 to flip-flop 13 is approximately proportional to the rate of change of the output voltage applied from rectifier 2. The circuit of flip-flop 13 and its input connection are arranged to enable the flip-flop to change from a stable state to an unstable state in response to the application to its input of voltage that is above a predetermined value and that has the sense obtained in response to a decrease in voltage at the output of rectifier 2. As the flip-flop changes from its stable state to its unstable state, the change in voltage is differentiated for applying a short pulse or spike to the base or control element of short-circuiting transistor 17. The pulse has the required sense for causing transistor 17 to become conductive. The output of the flip-flop is connected through capacitor 14 to the base and the base is connected through resistor 15 to a common return circuit. The values of capacitor 14 and resistor 15 are chosen so that the combination functions as a differentiator for developing a short pulse that is applied to the base of transistor 17. A diode 16 is connected between the base and emitter of transistor 17, the emitter being connected to the common return circuit or ground, to prevent application of reverse voltage between the base and emitter of the transistor.

The gain of the amplifier 12 and the operating threshold of the flip-flop 13 are adjusted until the flip-flop operates when the rate of change of the output voltage of rectifier 2 exceeds a predetermined value to apply a short pulse to transistor 17. Normally transistor 17 is nonconductive and the control voltage across capacitor 5 of the long-time constant filter is applied in the usual manner through diode 7 to the automatic-gain-control conductor 8. The conductor 8 is also connected to the collector transistor 17. When the impulse which is derived from the operation of flip-flop 13 is applied to the base of transistor 17, the transistor becomes conductive for only during the very short duration of the pulse for momentarily short-circuiting capacitor 5 through diode 7. Diode 7 is connected in the required sense to conduct the discharge current of capacitor 5.

Although this invention has been described with respect to a particular embodiment thereof, it is not to be so limited, as changes and modifications may be made therein which are within the spirit and scope of the invention as defined by the appended claims.

I claim:

1. In an automatic-gain-contol circuit having a long-time constant filter including a filter capacitor, a gain control conductor connected to said long-time constant filter, a rectifier having its output connected to said long-time constant filter, radio-frequency receiving means connected to the input of said rectifier, the gain of said radio-frequency means being controlled by application of voltage from said filter to said gain control conductor; means for momentarily discharging the control voltage on said filter capacitor comprising, differentiating means, means for applying rectified unfiltered output from said radio-frequency receiving means to said differentiating means, switching means having a pair of switching elements normally providing an open circuit therebetween and a control element for controlling the conductivity between said switching elements, said switching elements being connected in parallel with said filter capacitor, impulse means having an output circuit connected to said control element of said switching means and an input connected to said differentiating means, and said impulse means operating in response to the signal level at the output of said radio-frequency receiving means decreasing faster than a predetermined rate for momentarily applying an operating voltage to said control element of said switching means, said switching means operating in response to the application of said operating voltage to complete a low-resistance circuit between said switching elements for momentarily short-circuiting said filter capacitor.

2. An automatic-gain control circuit that changes control voltage instantaneously in response to an abrupt demand for decreased control voltage comprising, radio-frequency receiving stages having a gain control conductor, a long-time constant filter, a short-time constant filter, means for rectifying the output of said radio-frequency receiving stages and applying the resulting direct-current voltage through different isolating circuits to said long-time constant filter and to said short-time constant filter, a monostable flip-flop, a differentiator connected to the output of said flip-flop, means for connecting said short-time constant filter to a control circuit of said flip-flop, said flip-flop operating to an unstable state in response to the decrease of signal at the output of said radi-frequency receiving stages exceeding a predetermined rate, switching means connecting to said long-time constant filter, the output of said flip-flop being connected through said differentiator to said switching means for forming a sharp pulse in response to the operation of said flip-flop for application to said switching means, and said switching means operating momentarily in response to the application of said sharp pulse for neutralizing the control voltage on said long-time constant filter.

3. In an automatic-gain-control circuit having a rectifier for receiving signal from receiver radio-frequency stages, a capacitor in the output circuit of said rectifier, and an automatic-gain-control conductor connected to said filter capacitor for controlling the gain of said radio-frequency stages according to the amplitude of signal voltage applied to said rectifier; a control circuit responsive to rapid decrease of signal level applied from said radio-frequency stages to said rectifier to neutralize momentarily the control voltage of said capacitor comprising, diode means for isolating said capacitor from said output of said rectifier so that the output voltage of said rectifier instantly follows changes in level of signal applied to said rectifier, a filter having a time constant that is short relative to the time constant provided by said filter capacitor, an amplifier, a monostable flip-flop and a differentiator connected in cascade, means for coupling the unfiltered output of said rectifier to said short-time constant filter for applying the differential voltage of said output to the input of said amplifier, said flip-flop operating in response to the application of said differential voltage of the sense corresponding to a decrease in level of said signal and having an amplitude greater than a predetermined amplitude, a transistor switch having a pair of switching elements connected in parallel with said filter capacitor and a control element for controlling the conductivity between said switching elements, said switching elements normally providing an effective open circuit, and said differentiator in response to the operation of said flip-flop applying a pulse to said control element to cause said switching elements to become conductive momentarily for short-circuiting said filter capacitor to neutralize the control voltage thereon.

References Cited by the Examiner

UNITED STATES PATENTS

| | | | |
|---|---|---|---|
| 2,569,289 | 9/1951 | Clark | 325—410 |
| 2,957,074 | 10/1960 | Trevor | 325—319 |

ROBERT H. ROSE, *Primary Examiner.*

KATHLEEN H. CLAFFY, CHESTER L. JUSTUS, *Examiners.*

R. A. FARLEY, R. LINN, *Assistant Examiners.*